J. H. GRAVELL.
ELECTRIC WELDING MACHINE.
APPLICATION FILED JAN. 3, 1919.
1,312,845.
Patented Aug. 12, 1919.
2 SHEETS—SHEET 1.
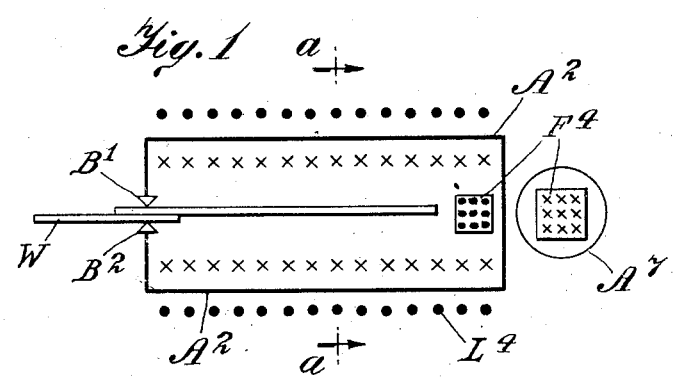
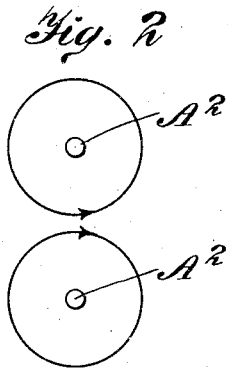
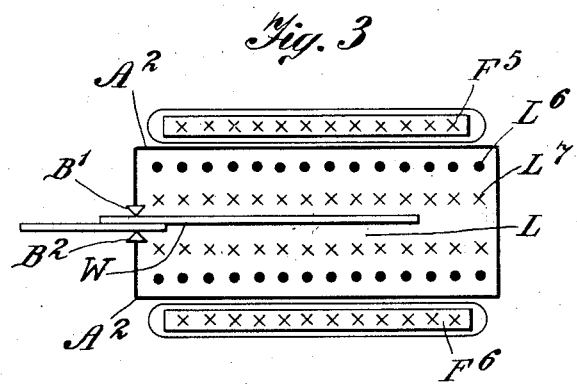
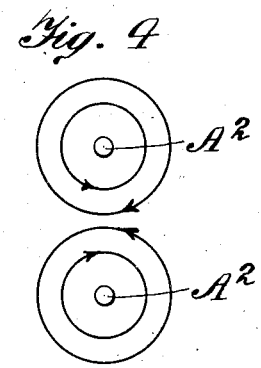
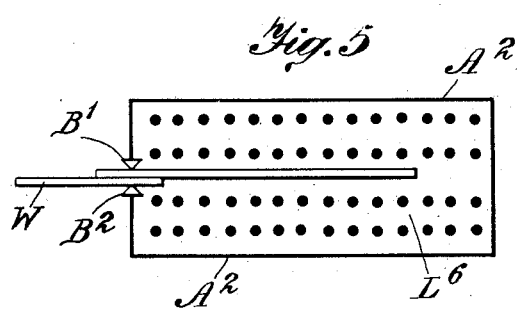
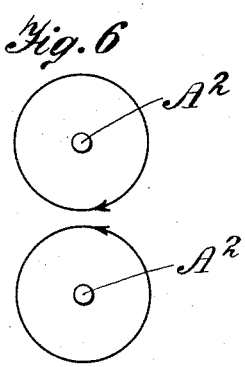
Inventor
James H. Gravell
By his Attorneys
Townsend & Decker

UNITED STATES PATENT OFFICE.

JAMES H. GRAVELL, OF PHILADELPHIA, PENNSYLVANIA, ASSIGNOR TO THOMSON SPOT WELDER COMPANY, OF BOSTON, MASSACHUSETTS, A CORPORATION OF MASSACHUSETTS.

ELECTRIC WELDING-MACHINE.

1,312,845.   Specification of Letters Patent.   Patented Aug. 12, 1919.

Application filed January 3, 1919. Serial No. 269,491.

*To all whom it may concern:*

Be it known that I, JAMES H. GRAVELL, a citizen of the United States, and a resident of Philadelphia, in the county of Philadelphia and State of Pennsylvania, have invented certain new and useful Improvements in Electric Welding-Machines, of which the following is a specification.

My invention relates to that class of electric welding, riveting, forging or other metal working machines in which a throat or gap is provided to receive the work, the arms or jaws between which said gap is provided forming or carrying electric conductors by which the heating current is conveyed to the desired point.

It is well known that in machines of this class employed for spot welding or riveting or other operations it is difficult and almost impossible to secure a satisfactory weld or action at a great distance in from the edge of the work such as a sheet of metal to be welded or riveted, owing to the fact that the current flowing in the arms of the machine, which arms ordinarily form a part of the secondary circuit, tends to produce a magnetic field in the work and space between the arms which opposes the flow of the heating current. This alters the power factor to such an extent that to secure a satisfactory welding or other current the primary current must be impracticably large.

The object of my present invention is to avoid this difficulty in machines of the above character, to which end my invention consists substantially in utilizing the space between the arms for conducting lines of force generated by suitable primary winding in an open magnetic circuit iron core, as will be hereinafter more particularly set forth.

In the accompanying drawings Figures 1 and 2 illustrate diagrammatically the nature of the difficulty in the present forms of machines which it is the aim of my invention to overcome.

Figs. 3, 4, 5 and 6 are other diagrams illustrating in a general way the principle of my present invention.

Figure 7:
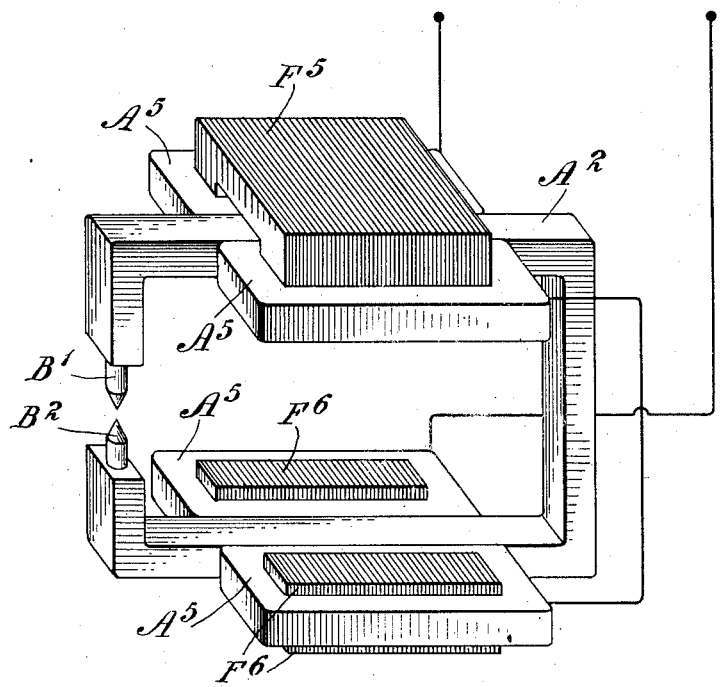
Fig. 7 is a perspective view of a construction of apparatus embodying my invention.

Fig. 1 illustrates diagrammatically the present method and construction of a machine for supplying heating current away from the edge of the work in a welding, riveting or other metal working operation, the work being shown in this instance as consisting of two plates of metal W to be welded together by an operation involving the use of electrodes $B^1$ $B^2$ by which the heating current is supplied to the work and, if desired, pressure also. $A^2$ is the secondary circuit or conductor transmitting the current passed through the work by said electrodes. $F^4$ is the core of the transformer by which the current is generated in the secondary circuit and $A^7$ is the primary coil for generating the magnetic flux in the core $F^4$.

In this sketch the magnetic lines of the magnetic field set up by the current flowing in the arms $A^2$ or substantially parallel portions of the secondary arranged to provide the work gap are indicated by the . . . and x x x. The (dots) . . . show the lines approaching the observer and the (crosses) x x x show the lines moving away from the observer.

Fig. 2 shows a section of Fig. 1 along the dotted line *aa* and the circles around the conductors $A^2$ illustrate the direction of the lines of force. When a magnetic field is generated by the primary $A^7$ in the core $F^4$ which is usually of the closed magnetic circuit type, a secondary current is produced in the arms or conductors $A^2$. The lines of force generated by this current thread through the space between the arms and partly in the iron of the work and tend to prevent the flow of the heating current. Should the number of these lines of force exactly equal the number of lines of force in the iron $F^4$ of the transformer, no current whatever would flow in the secondary. It is evident, therefore, that the less the lines of force flowing or threading through the secondary between the arms $A^2$, the greater will be the heating current which may be applied to the work.

One of the reasons why it has been found impractical to make the secondary arms very long (three or four feet at the present time seem to be the commercial limit) is that by extending the secondary more room is provided for the accommodation of the lines of force which tend to keep back the currents.

My present invention consists substantially in altering the construction of the electrical parts to utilize the space inside the parallel arms of the machine for conducting the lines of force generated by a primary winding, which lines of force in the usual forms of machine have been heretofore conducted through the secondary by way of a portion of the iron core $F^4$, Fig. 1.

Fig. 3 illustrates diagrammatically my improved arrangement wherein $F^5$ and $F^6$ are magnetic cores (shown also in Fig. 7) of a transformer of the open magnetic circuit type producing lines of force through the air space inclosed by the arms $A^2$ as indicated at $L^6$. It will be noted that the lines which are produced by the core or cores and shown at $L^6$ are in opposition to the lines which would be produced by the portion $A^2$ of the secondary circuit indicated in Figs. 1 and 3, which latter lines are designated $L^7$ in the Fig. 3. This opposition of the two sets of lines of force is shown by the arrows in Fig. 4 which is a cross-sectional diagrammatic view of Fig. 3.

As lines of force cannot flow in opposite directions at the same time in the same material or space the result of my improved arrangement is as shown in Fig. 5 where only lines of force which cause current to flow in the two arms $A^2$ thread through the secondary. As is evident from this figure, the lines of force flowing in the direction as shown in $L^6$ produce a current in the portion of secondary or arms $A^2$ and said arms are not producing lines of force which automatically hold the current back. So long, therefore, as lines of force in the proper direction are provided and caused to thread through the secondary and lines of force in the opposite direction are prohibited, the secondary can be extended indefinitely without encountering the difficulties from the self-induction or reaction above referred to.

Figure 8:
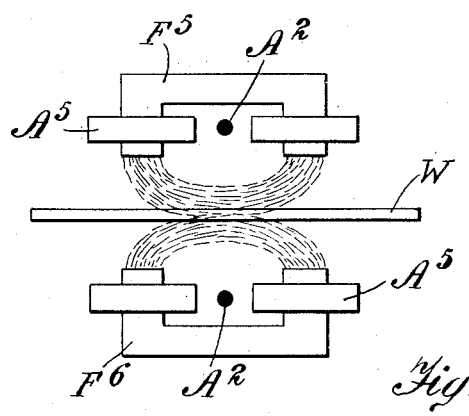
Fig. 8 is an end elevation thereof diagrammatic in character.

In the practical construction of an apparatus to embody my invention I propose to employ, by preference, two transformers one located above the work and another located beneath the work as shown in Figs. 7 and 8. In these figures, as before, $A^2$ indicates the secondary consisting, as usual and by preference, of a single turn of massive copper, while $B^1$ $B^2$ indicate the work engaging terminals operated and constructed in any desired way as well understood in the art. $F^5$ $F^6$ are the magnetic cores, each of the open circuit type with the poles pointing toward the work. $A^5$ indicates the primary coils wound on the legs of the transformers. The primaries of the transformers are so connected that the resulting magnetic field in the space between the arms $A^2$ and connecting the poles of the transformer cores so as to complete the circuit for the magnetic lines of the cores themselves will be in opposition to the field tending to be produced in the work and in the space by the currents flowing in the secondary $A^2$ or arms carrying the generated current.

The effect, as will be seen, is to utilize the work and the work space as a part of the core or magnetic circuit of the transformer and the magnetic lines in this space or in the work will be, according to this arrangement, lines assisting the welding current instead of reducing it.

It is evident that by using transformers practically along the entire length of the gap it is possible to entirely neutralize the counter-induction effect of the work or of the lines of force which would otherwise circulate therein from the action of the heating current in the arms $A^2$ with the result that a machine can be produced with an exceptionally long depth of throat to give a large heating current with an unusually high power factor.

A machine constructed according to my invention can be used to great advantage in the manufacture of large steel plates and small steel plates or in the building of steamships. By the use of my machine a new field of electric welding and riveting is opened since heretofore machines of this kind have been restricted to a throat of but a few feet.

What I claim as my invention is:

1. In an apparatus of the character described, a transformer consisting of a primary winding on an open magnetic circuit core and a secondary inclosing the air path of the core.

2. In an apparatus of the character described, a transformer having an iron core provided with an air gap, a primary coil wound on the iron part of the core and a secondary wound to include the air part of the core.

3. In an electric metal working apparatus having a gap for receiving the work, an open circuit magnetic core whose magnetic circuit is completed through said gap, a primary winding located on the core and a secondary inclosing the gap.

4. In an electric metal working machine having a conductor for carrying the heating current spanning the work and means for generating electricity in said conductor by passing magnetic lines of force through said gap and work located therein.

5. In an apparatus of the character described, the combination with the arms on opposite sides of the work gap, of means for producing magnetic lines of force circulated through the air space and work in said gap to introduce a current in said arms.

6. The method of neutralizing the self-induction of the secondary circuit in an electric metal working machine, consisting in utilizing the air space inclosed by the secondary for transmitting generating lines of force opposed to those set up by the current in the secondary.

Signed at New York, in the county of New York and State of New York this 31st day of December A. D. 1918.

JAMES H. GRAVELL.

Witnesses:
F. B. TOWNSEND,
IRENE LEFKOWITZ.